Oct. 31, 1933.                J. HORAN                1,932,626
GAUGE AND GUIDE FOR LAYERING BUTTER
Filed Oct. 2, 1930
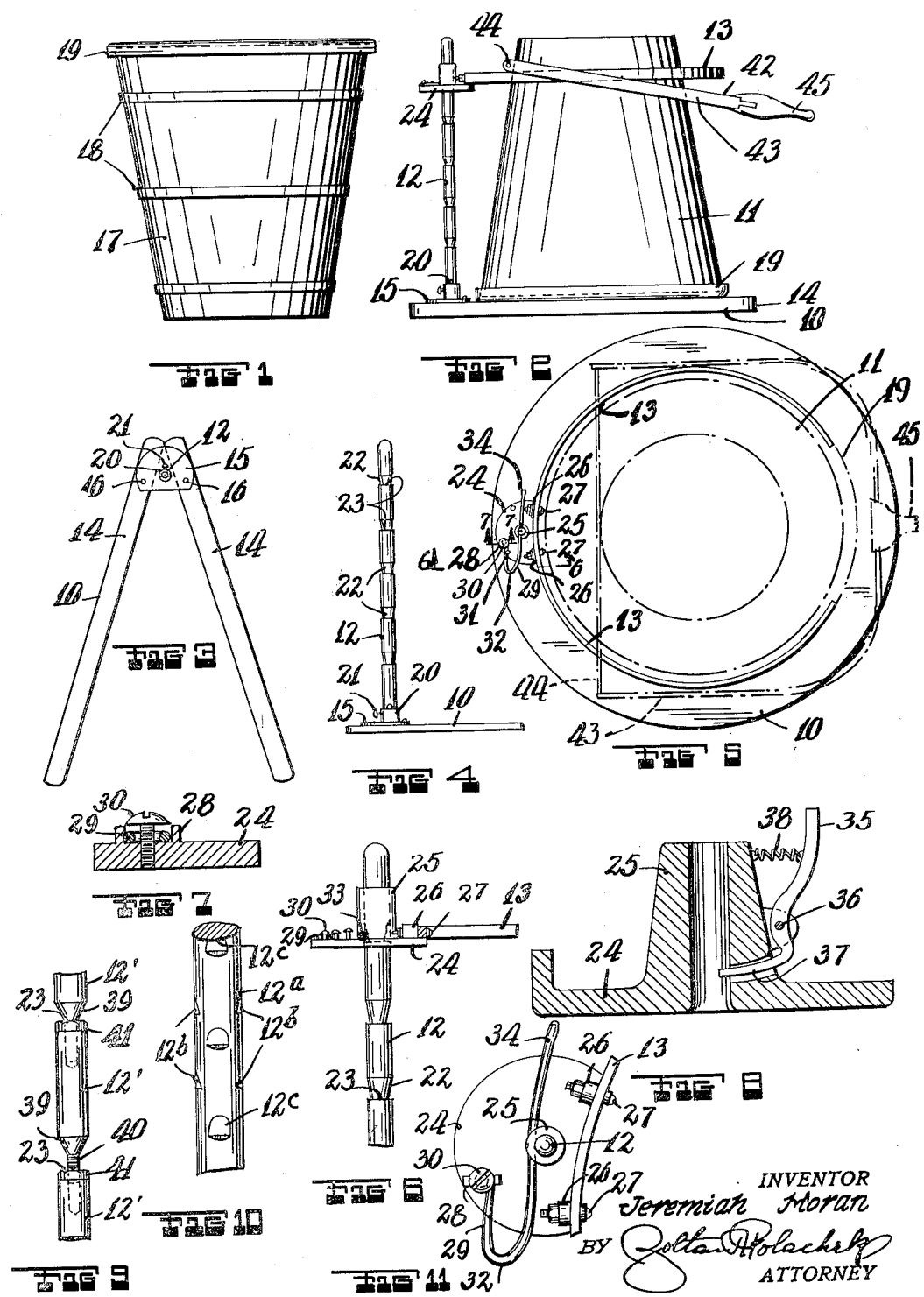
INVENTOR
Jeremiah Horan
BY
ATTORNEY Patented Oct. 31, 1933

1,932,626

UNITED STATES PATENT OFFICE 1,932,626

GAUGE AND GUIDE FOR LAYERING BUTTER

Jeremiah Horan, New York, N. Y.

Application October 2, 1930. Serial No. 485,927

6 Claims. (Cl. 31—27)

This invention relates to new and useful improvements in a gauge and guide for layering butter and the like.

The invention has for an object the provision of a device of the class mentioned which is of simple durable construction, dependable in use and efficient in action, and which can be manufactured and sold at a reasonable cost.

It is customary to sell butter in wooden tubs and to remove the butter before sale and to cut it into layers. After the butter has been cut into layers it is reinserted in the tub and thus sold. The cutting is accomplished by an element known as a butter cutting wire comprising a tightly stretched wire in a frame. Such cutting is done without the use of any guides and results in layers which are not uniform, that is, they are thicker at one side than at the other. When selling butter from the tub, the clerk attempts to guess the weight ordered by the customer, as for example, one pound, one-half a pound, etc. If the layers were of uniform size, after a little experience, the clerk would be able to very accurately guess the right size to be cut off.

The invention proposes a base for supporting in an upright position the butter to be layered, a vertical post on said base, a horizontal butter knife guide ring for encircling said butter and slidably mounted on said post, and coacting means on said ring and post for holding said guide ring as desired in predetermined positions on the post.

When butter is prepared for sale by the use of a gauge and guide according to this invention, the layers are uniform, that is, they are of the same thicknesses on all sides. This aids materially in guessing the correct amount to cut off for each sale. The invention has for a further purpose the provision of a post with reduced sections formed by tapered portions terminating in a shoulder to guide descending of a butter cutting wire guide ring in steps and ascending unrestricted.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a side elevational view of a tub of butter as conventionally received from the farm or dairy.

Fig. 2 is a side elevational view of the butter removed from the tub and shown resting upon the gauge and guide according to this invention.

Fig. 3 is a plan view of the base and post of the guide shown in Fig. 2.

Fig. 4 is a fragmentary side elevational view of Fig. 3.

Fig. 5 is a plan view of the butter cutting wire guide ring for engagement on the post, but shown per se.

Fig. 6 is a fragmentary view showing in detail the butter cutting wire guide ring upon the post.

Fig. 7 is a fragmentary sectional view taken on the line 7—7 of Fig. 5.

Fig. 8 is a sectional view of a modified form of bracket for holding the guide ring upon the post.

Fig. 9 is a fragmentary view similar to a portion of Fig. 4, but illustrating a modification.

Fig. 10 is a fragmentary perspective view of a vertical post constructed according to a modified form.

Fig. 11 is an enlarged fragmentary view of Fig. 5.

The guide and gauge for layering butter and the like, comprises a base 10 for supporting in an upright position the butter 11 to be layered, a vertical post 12 on said base 10, a horizontal butter cutting wire guide ring 13 for encircling the butter 11 and slidably mounted on said post 12, and coacting means on said ring 13 and post 12 for holding the guide ring 13 as desired in predetermined positions on the post.

The base 10 consists of a pair of flat bars 14 for resting upon some flat surface and connected at one end by a bracket 15. This bracket rests upon the bars 14 and pintle pins 16 engage through the brackets and through the bars for pivotally holding the bars. The pintle pins 16 are arranged near one of the ends of the bars so that the ends of the bars strike together after the bars have been separated a certain amount as shown in Fig. 3. It is intended that the butter be rested upon these bars in spread condition. When the device is to be stored away, the device may be collapsed so as to be parallel with each other and thus take up a minimum compass.

In Fig. 1 a tub of butter 17 has been illustrated and is of the type conventionally used. It consists of a hard wood tub formed from boards held together by hoops 18. It is provided with a cover 19. For layering the butter, it is necessary that the tub as shown in Fig. 1 be turned upside down upon the base 10, and then the tub per se removed so that the butter rests on the cover 19 which in turn rests upon the base 10 as shown in Fig. 2. In this condition layering may be accomplished.

The vertical post 12 is supported in vertical condition by engaging in a tubular portion 20 of the said bracket 15. A set screw 21 threadedly engages through the tubular portion 20 and abuts against the post for holding it in fixed position. As shown on the drawing, the post is formed with a plurality of reduced portions equally spaced and each reduced portion comprising a tapered section 22 terminating at the bottom in a shoulder 23. The means for holding the ring guide in proper positions to allow the layering coacts with the shoulder 23 and the reduced tapered portions 22 as hereinafter further described. The slidable arrangement of the guide ring 13 upon the post is accomplished by a disc 24 having a tubular portion 25 slidably engaged on the post. A pair of lugs 26 project from the disc 24 and bolts 27 attach the ring guide 13 onto the said lugs 26.

The coacting means on the ring 13 and post 12 for holding said guide ring as desired in predetermined positions on the post comprises a tubular projection 28 near the periphery of the disc 24 and having a portion of its side wall cut away so that a spring 29 may have one of its ends turned around within said tubular portion 28 and the remaining portion of the spring extended through the opening. A screw 30 engages through the coiled end of the spring 29 and holds this end in place. A peg 31 projects from the disc 24 near the periphery of the disc and serves as an abutment for the spring 29. The central portion of the spring is bent as indicated by reference numeral 32 and then continues, and is coiled around the tubular projection 25 from the disc. The latter mentioned tubular projection is formed with an opening 33 in its side wall so that a portion of the spring 29 may extend through this opening and engage against the shoulders 23. The spring 29 at its free end terminates in a handle 34 so that this portion may be manually moved for disengaging it from the reduced portions of the post.

In the modified form of the device illustrated in Fig. 8, a modified means has been shown for constituting the coacting means on said ring and post for holding said ring as desired in predetermined positions on the post. This latter means comprises a catch 35 pivotally mounted at 36 intermediate of its ends upon the tubular portion 25 of the disc 24, and having its rear end constituting a handle and its front end engaging through an aperture 37 in the side of the tubular portion and into the space formed by the reduced portions of the post. A spring 38 acts between the catch 35 and the tubular portion 25 for normally urging the catch into its operative position.

In the modified form of the device illustrated in Fig. 9, a post has been shown which is provided with means to adjust the distances between the various shoulders so as to adjust the thicknesses of the layers into which the butter is cut. This latter means comprises a plurality of separate post sections 12' constituting the post of the device, and the bottom ends of each of the sections being tapered as indicated by reference numeral 39 and terminating in threaded portions 40 engageable in threaded aperture in the tops of the different sections. A nut 41 is threadedly engaged upon each of the threaded portions and the top of the nut constitutes the shoulder 23.

For changing the spacing between the shoulders 23, it is merely necessary to loosen the nuts 41, turn the post sections 12 relative to each other to accomplish extension or retraction, and then to again lock the parts in fixed positions by turning down the nuts. In Fig. 2 a butter knife 42 has been illustrated to show the manner in which the butter 11 is cut. This cutting wire comprises a bowed body 43 adapted to partially encircle the butter 11 and supporting at its free ends a wire 44 constituting the cutting edge of the cutter. A handle 45 connects with the body 43 so that the body may be drawn and the guide wire 44 moved along the butter cutter guide ring 13 and accomplish cutting.

In the modified form shown in Fig. 10, the vertical post 12$^a$ is provided with two pairs or rows of notches 12$^b$ and 12$^c$ spaced different distances apart to change the size of layering of the butter by turning post 12$^a$, 90°.

The operation may be traced by assuming the parts in the condition shown in Fig. 2. The butter cutting wire may now be drawn towards the right so as to cut off one layer of the butter. Next the handle 34 or the catch 35, depending upon which modified form of the device is used, is momentarily moved so that the disc 24 is momentarily released. It will now drop down until it is arrested by the catch 35 or the spring 29 engaging upon the next shoulder 23 upon the post 12. Then the butter cutting wire may be used to cut a second layer. This operation may be continued until all the layers have been cut. The guide ring 13 insures parallel cutting of each of the layers so that they are of the same thicknesses on all sides, and the spacing of the reduced portions upon the post 12 insures equal thicknesses for all the layers.

After cutting has been completed, the disc 24 may be raised without interruptions in that the catch 35 and the spring 29, as the case may be, merely idles over the tapered portions of the post, and in this manner may be moved off and the device dismantled for storing purposes.

It is to be understood that the vertical post 12 may be of round, square or of any other cross section and either one or two of these posts may be used. For two posts a suitable wire may be provided which is attached to the post toward which the cutting takes place and detached from the other post, and when the direction of cutting is reversed the wire is detached from the first post and attached to the other post.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A gauge and guide for layering butter and the like, comprising a base for supporting in an upright position the butter to be layered, a vertical post on said base, a horizontal butter cutting guide ring for encircling said butter and slidably mounted on said post, and coacting means on said ring and post for holding said guide ring as desired in predetermined positions on the post, said base comprising flat bars for resting upon a flat surface and joined at one of their ends respectively, said joining being accomplished by a bracket and pintle pins so that the flat bars may assume spread positions constituting the operative condition of the device and a folded condition for convenience in storing.

2. A gauge and guide for layering butter and the like, comprising a base for supporting in an upright position the butter to be layered, a vertical post on said base, a horizontal butter cutting guide ring for encircling said butter and slidably mounted on said post, and coacting means on said ring and post for holding said guide ring as desired in predetermined positions on the post, said coacting means comprising reduced portions formed in the post and a catch mechanism connected with said ring for engaging the reduced portions, said catch mechanism comprising a disc having a tubular portion slidably mounted on said post and constituting a support for said ring guide, said portion having an opening through the side thereof, a tubular projection having an opening and projecting from near the periphery of the disc, a spring having one of its ends turned around within the tubular projection and leaving the projection thru the said opening and engaging against the post thru the opening formed in the tubular portion, and a screw engaging thru the coiled end of the spring.

3. A gauge and guide for layering butter and the like, comprising a base for supporting in an upright position the butter to be layered, a vertical post on said base, a horizontal butter cutting guide ring for encircling said butter and slidably mounted on said post, and coacting means on said ring and post for holding said guide ring as desired in predetermined positions on the post, said coacting means comprising reduced portions formed in the post and a catch mechanism connected with said ring for engaging the reduced portions, said catch mechanism comprising a disc having a tubular portion slidably mounted on said post and constituting a support for said ring guide, said portion having an opening through the side thereof, a tubular projection having an opening and projecting from near the periphery of the disc, a spring having one of its ends turned around within the tubular projection and leaving the projection thru the said opening and engaging against the post thru the opening formed in the tubular portion, and a screw engaging thru the coiled end of the spring, said other end of the spring being formed as a handle.

4. A gauge and guide for layering butter and the like, comprising a base for supporting in an upright position the butter to be layered, a vertical post on said base, a horizontal butter cutting guide ring for encircling said butter and slidably mounted on said post, and coacting means on said ring and post for holding said guide ring as desired in predetermined positions on the post, said coacting means comprising reduced portions formed in the post and a catch mechanism connected with said ring for engaging the reduced portions, said catch mechanism comprising a disc having a tubular portion and constituting the support for said ring guide, said tubular portion having an opening in the side thereof, and a spring attached at one end on the disc and intermediately engaging said tubular portion and having a portion engaging through the side opening against the post for engaging against said catches.

5. A gauge and guide for layering butter and the like, comprising a base for supporting in an upright position the butter to be layered, a vertical post having shoulders and mounted on said base, a horizontal butter cutting guide ring for encircling said butter and slidably mounted on said post and coacting means on said ring and post for holding said guide ring as desired in predetermined positions on the post, and means for adjusting the distances between the shoulders formed in said vertical post and constituting a portion of said coacting means.

6. A gauge and guide for layering butter and the like, comprising a base for supporting in an upright position the butter to be layered, a vertical post having shoulders and mounted on said base, a horizontal butter cutting guide ring for encircling said butter and slidably mounted on said post and coacting means on said ring and post for holding said guide ring as desired in predetermined positions on the post, and means for adjusting the distances between the shoulders formed in said vertical post and constituting a portion of said coacting means, said adjustment means comprising post sections constituting said post and having their lower ends reduced and threadedly engaged in the upper ends of adjacent sections, and nuts engaging said threaded portions and the ends of the post sections.

JEREMIAH HORAN.